Sept. 1, 1970 G. MELCHIOR 3,526,705

SUBCARRIER CIRCUITS FOR COLOUR TELEVISION APPARATUS

Filed Feb. 7, 1967

INVENTOR:
GERARD MELCHIOR
BY Kurt Kelman
AGENT

United States Patent Office 3,526,705

Patented Sept. 1, 1970

3,526,705

SUBCARRIER CIRCUITS FOR COLOUR TELEVISION APPARATUS

Gerard Melchior, Asnieres, France, assignor to Compagnie Francaise de Television, a corporation of France Filed Feb. 7, 1967, Ser. No. 614,458
Claims priority, application France, Feb. 16, 1966, 49,876
Int. Cl. H04n 9/32
U.S. Cl. 178—5.4 5 Claims

ABSTRACT OF THE DISCLOSURE

The disclosure relates to a circuit for generating a color subcarrier in colour television systems of the type in which the subcarrier is used for alternately transmitting two color signals $D_1$ and $D_2$. The subcarrier produced is amplitude modulated by a signal $D=\sqrt{D_1^2+D_2^2}$, with $D_1=D \cos \varphi$ and $D_2=D \sin \varphi$, and frequency modulated by a signal M which is alternately equal to $D_1/D=\cos \varphi$ and $D_2/D=\sin \varphi$.

The present invention relates to an improvement in circuits for generating and handling a colour subcarrier in colour television systems in which the composite video signal comprises a wide-band luminance signal and a subcarrier, usually superimposed upon the luminance signal in the upper region of its frequency band, and which is used for alternately transmitting two colour signals, which are linear functions of the primary colour signals, usually gamma-corrected, R, B, and G, the alternation occurring at the line frequency. Those two colour signals will generally be referred to as $D_1$ and $D_2$. At the receiver, these two signals are repeated to become simultaneous and combined with the luminance signal to obtain the three primary colour signals which are applied to the picture reproducing device. One or two demodulators are used, according to whether the repetition of the signals $D_1$ and $D_2$ occurs at video or subcarrier frequency.

Numerous devices have been proposed for modulating the subcarrier for transmitting signals $D_1$ and $D_2$ and, in order to estimate their respective advantages, a problem referred to generally as the "visibility of the subcarrier" must be considered. More accurately, this concerns the parasitic structures appearing on the screens of colour television receivers (which simply use the luminance signal in order to produce a black and white picture), due to the presence of the subcarrier in the frequency spectrum of the luminance signal.

Taking this important factor into account, the methods of modulating the subcarrier can be divided into two main categories:

(1) Suppressed carrier amplitude modulation.
(2) Other kinds of modulation.

This being so, in the systems of category (1), the subcarrier $S(t)$ takes alternately the form $D_1 \sin wt$ and $D_2 \sin wt$, where $w$ is a constant angular frequency. These systems have the disadvantage of conveying insufficient information if one at least of the signals $D_1$ and $D_2$ is an algebraic one, which is usually the case.

The subcarrier $S(t)$ in that case does not contain all the information required to restore the signals $D_1$ and $D_2$, those two signals can only be obtained at the receiver, if an additional phase reference information is transmitted.

As far as the visibility of the subcarrier is concerned, these systems offer the advantage that, due to the suppressed carrier amplitude modulation of the subcarrier, the latter disappears when the amplitude modulating signal is zero. This allows a large variation range of the amplitude of the subcarrier, with a relatively low means energy level of the subcarrier. However, this advantage is associated with a considerable drawback, due to the fact that the amplitude modulation of the subcarrier varies as a function of that one of the two signals $D_1$ and $D_2$, which is being transmitted; this amplitude variation, from one line to the other in the same vertical area of the screen, is very disturbing to the viewer.

Systems using the conventional amplitude modulation without carrier suppression, or frequency modulation can be considered as being of category (2). In neither case does the amplitude of the subcarrier become zero, when the modulating signal is zero.

Frequency modulation has the advantage that the information is not impaired by subcarrier amplitude variations, due for example to selective attenuation in links. As far as noise is concerned, it is generally possible to provide better noise reduction with a frequency modulated subcarrier than with an amplitude modulated one as long as the noise level does not exceed a certain critical threshold. Once this threshold is reached, the frequency modulated subcarrier becomes, on the contrary, extremely sensitive to noise interference. An analysis of this complex phenomenon indicates that the limiter preceding the frequency discriminator is a problem in this respect.

The present invention allows to unite to a great extent the inherent advantages of the various known systems.

According to the invention, there is provided a colour subcarrier generating circuit for colour television systems of the type in which the composite video signal comprises a luminance signal and a colour subcarrier used for alternately transmitting two colour signals $D_1$ and $D_2$, which are linear functions of the primary colour signals, the alternation taking place at line frequency, wherein said subcarrier generating circuit comprises: a first circuit, having an output, for generating a signal A, said signal A being a function of the primary colour signals which cannot become zero unless $D_1$ and $D_2$ are simultaneously equal to zero; a second circuit, having an output, for generating a signal M which is alternately equal to $D_1/A$ and $D_2/A$, the alternation taking place at the line frequency; a frequency modulator, having a modulation input coupled to the output of said second circuit, and an output; and an amplitude modulator, having a modulation input coupled to the output of said first circuit, a carrier input coupled to the output of said frequency modulator, and an output, said output of said amplitude modulator being the output of said colour subcarrier generating circuit, and supplying a signal which is amplitude modulated by said signal A and frequency modulated by said signal M.

There is further provided, according to the invention, a colour subcarrier handling circuit for restoring signals $D_1$ and $D_2$, from a colour subcarrier generated by means of a generating circuit according to the invention, said handling circuit comprising: at least one demodulator, responsive to both the amplitude and frequency of its input signal, said demodulator having an input; and means for applying to said demodulator input said subcarrier both amplitude modulated by signal A and frequency modulated by signal M.

It will be remarked that it has already been proposed, that both signals $D_1$ and $D_2$ be transmitted simultaneously, one by amplitude modulation of the subcarrier, and the other by frequency modulation thereof, these two signals being respectively obtained at the receiving end by amplitude detection of the subcarrier and by frequency demodulation thereof with prior amplitude limiting. This arrangement has the obvious drawbacks inherent to both the conventional frequency modulation and amplitude modulation without carrier suppression.

The two signals $D_1$ and $D_2$ can always be written $D_1=D\cos\varphi$ and $D_2=D\sin\varphi$.

In the case where $D_1$ and $D_2$ are two chrominance signals, i.e. two linear and homogeneous functions of the primary colour signals R, B and G, which are zero for $R=B=G$, the signal A is preferably a function of $D_1$ and $D_2$, which is zero for $D=0$ and is independent of $\varphi$.

It will thus be seen that in the case of particular interest here, namely where $D_1$ and $D_2$ are two chrominance signals, the inherent advantages of a subcarrier whose amplitude is zero for $D=0$ can be obtained, by making $A=D$. On the other hand, the faithful reproduction of the hue, determined by $\varphi$ (and faithful reproduction of the hue is much more important than faithful reproduction of the saturation information, which depends upon D) takes advantage of the inherent fidelity of frequency modulation.

Finally, this device does not require any delay device of the kind which must produce a delay which is simultaneously very long and very accurate with respect to the duration of one cycle of the subcarrier resting frequency.

The invention will be better understood, and additional features will become apparent, from the following more detailed description in conjunction with the accompanying drawings, in which.

FIG. 1 illustrates schematically an embodiment of a modulator circuit which can be used in the subcarrier generating circuit according to the invention.

Figure 1:
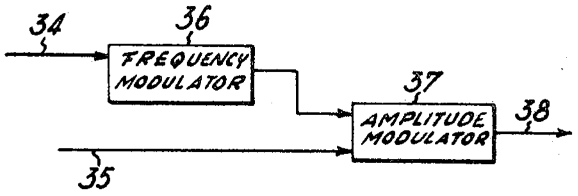
FIG. 1 is the diagram of the modulator circuit of an embodiment of a subcarrier generating circuit according to the invention.

The video frequency signals M and A are respectively applied to the inputs 34 and 35.

The input 34 is connected to the modulation input of a frequency modulator 36 which is built up by a frequency modulated oscillator, followed, if necessary, by an amplitude limiter in order to supply a constant amplitude output signal, its instantaneous frequency $F_1$ being a linear function of M.

The output signal from the frequency modulator 36 is applied to the carrier input of an amplitude modulator 37, preferably a balanced modulator, i.e. a modulator of the type used for suppressed carrier amplitude modulation when used with a constant frequency carrier. The signal A is applied to the modulation input of modulator 37.

At the output 38 of the amplitude modulator 37, a signal A sin P, having a phase P and an instantaneous frequency $F_i$, is thus obtained.

It will now be assumed that the signal $D_1=D\cos\varphi$ and $D_2=D\sin\varphi$ are two chrominance signals and that signal A is taken equal to D, M being then alternately equal to $\cos\varphi$ and to $\sin\varphi$, the alternation taking place at line frequency (this should be understood hereinafter whenever alternation is mentioned without other qualification).

The signals $$D=\sqrt{D_1^2+D_2^2},\ \cos\varphi=D_1/D,\ \sin\varphi=D_2/D$$

can be obtained from the signals $D_1$ and $D_2$ by conventional operations and the signal M can subsequently easily be derived from the signals $\cos\varphi$ and $\sin\varphi$.

Figure 2:
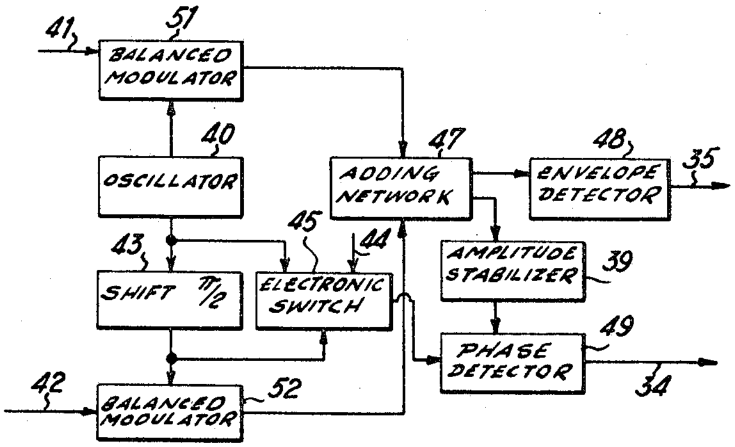
FIG. 2 is the diagram of an embodiment of the circuit for producing the modulating signals applied to the modulating device of FIG. 1.

FIG. 2 illustrates a preferred embodiment of the device for generating the signals A and M, which are applied to the modulator circuit of FIG. 1.

The signals $D_1$ and $D_2$ are applied to the inputs 41 and 42.

These inputs 41 and 42 respectively feed the modulation inputs of two balanced modulators 51 and 52, the carrier inputs of which receive a sinusoidal wave of constant angular frequency $w$, supplied by an oscillator 40, the modulator 51 receiving this wave directly and the modulator 52 receiving it shifted in phase by $+\pi/2$ by a phase shifter 43.

The modulator 51 thus supplies a signal $D_1\sin wt$ and the modulator 52 a signal $D_2\cos wt$.

The outputs of the two modulators are connected respectively to the two inputs of an adding network 47 which supplies at each of its two outputs the signal:

$$X=D_1\sin wt+D_2\cos wt=D\sin(wt+\varphi)$$

The first output of the adding network 47 is connected to the input of an envelope detector 48, supplying the signal D at its output 35.

The second output of the adding network 47 is connected through a device 39 to the first input of a phase detector 49.

The device 39 is designed to keep the output signal of the adding network 47 at constant amplitude, without affecting its phase; it may be, for example an oscillator oscillating at the frequency $w$, locked in phase by the signal X.

The outputs of oscillator 40 and of phase shifter 43 are connected to the two signal inputs of an electronic switch 45, which has a control input 44 and changes its state during every horizontal blanking interval so that sinusoidal signals whose phases are $\sin wt$ and $\sin(wt+\pi/2)=\cos wt$ will appear alternately at its output.

The output of switch 45 is connected to the second input of the phase detector 49, which supplies alternately at its output the signals $\cos\varphi$ and $\cos(\pi/2-\varphi)=\sin\varphi$, that is to say the signal M.

The outputs 34 and 35 of the circuit of FIG. 2 constitute the corresponding inputs of the circuit of FIG. 1.

The subcarrier received at the output 38 of FIG. 1, as far as its frequency modulator is concerned, alternates at line frequency and it is advisable to add to it, during the horizontal or vertical blanking intervals, identification signals which make it possible to identify in the receiver the function ($\sin\varphi$ or $\cos\varphi$) of the signal M transmitted by frequency modulation. Circuits of this kind are known and used for example in the SECAM system with a conventional frequency modulation of the subcarrier.

The corresponding circuits have not been illustrated in FIG. 1.

In particular, two signals $a_1$ and $a_2$ of opposite polarities can be transmitted during periods, referred to as checking periods, included in each vertical blanking interval, so that in the time multiplexing (i.e. the alternation at line frequency of the transmission of two colour signals during active field durations) the signal $a_1$ occupies the same channel as the first colour signal and the signal $a_2$ occupies the same channel as the second colour signal.

For this it will be sufficient to apply the signal $a_1$ to input 41 and the signal $a_2$ to input 42 during the checking periods.

The circuit of FIG. 2 can be modified as far as the switching is concerned. It will be seen, for example, that instead of switching the sinusoidal signals applied to the second input of the phase detector 49, the signals $D_1$ and $D_2$ can be applied alternately to each of the two inputs 41 and 42, the second input of the phase detector then receiving always the same sinusoidal signal.

The modulated subcarrier can also be obtained by means of a feedback circuit, for example in the following way:

The signal A is applied to the modulation input of the amplitude modulator 37 of FIG. 1, and the signal M, applied to the modulation input of the frequency modulator 36, is supplied by a feedback loop comprising a subtractor, one input of which is connected through an amplitude responsive frequency discriminator to the output of the amplitude modulator 37, and the other input of which receives alternately the signals $D_1$ and $D_2$, the output of the subtractor being connected to the modulation input of the frequency modulator 36, by means of an amplifier, if necessary.

If $D_1$ and $D_2$ are two crominance signals, it will then be more advantageous not to use the signal D itself as signal A, but a signal derived directly from $D_1$ and $D_2$ at video frequency and having practically the same advantages. For instance A can be taken as being the sum of the absolute values of $D_1$ and $D_2$, or as being the absolute value of that one of the two signals $D_1$ and $D_2$, which has the higher absolute value.

Figure 3:
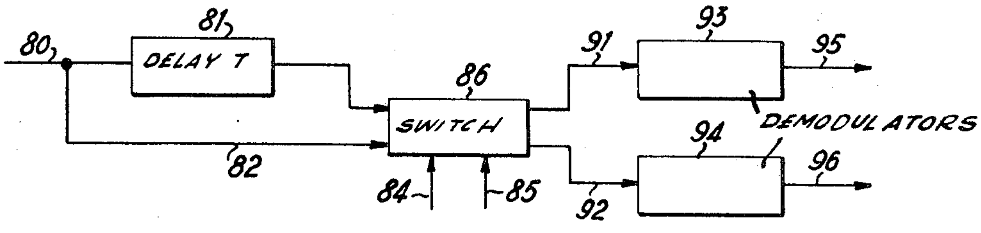
FIG. 3 is the diagram of an embodiment of the circuit handling the subcarrier generated by means of the circuits of FIGS. 1 and 2.

FIG. 3 illustrates an embodiment of the circuit for handdling the subcarrier in order to restore signals $D_1$ and $D_2$. This circuit can be used for any signal A and M. It will however be assumed hereinafter that signals A and M have been obtained by means of the circuit of FIG. 2.

The input 80 receives the subcarrier $S(t)$ and feeds in parallel two channels having the same gain, i.e. a direct channel 82 represented schematically by a simple wire and a delay channel 81 which produces a delay equal to T, where T is one line period.

The channels 81 and 82 feed the two inputs of a double switch 86 of known type supplying the subcarrier (the direct or delayed one) at its output 91 when its frequency modulation is a linear function of cos $\varphi$, and at its output 92 when its frequency modulation is a linear function of sin $\varphi$, these two outputs being respectively connected to the inputs of two frequency discriminators 93 and 94 having outputs 95 and 96.

The switch 86, which has two control inputs 84 and 85, is operated for this purpose by means of a signal at half the line frequency, supplied by a switching signal generator, having two states and which changes its state at the line frequency.

The signal having an amplitude D and an instantaneous frequency $F_1$, which is a linear function of cos $\varphi$, is thus applied to the discriminator 93 designed to respond linearly to both the signal amplitude and the instantaneous frequency of the subcarrier. This discriminator will thus supply an output signal $D \cos \varphi = D_1$.

The discriminator 94, which receives the signal of amplitude D and instantaneous frequency $F_1$, $F_1$ being a linear function of sin $\varphi$ will thus simultaneously supply $D \sin \varphi = D_2$.

To be more accurate, the discriminator 93, will alternately produce $D_1(t-T)$ and $D_1(t)$, whilst the discriminator 94 will alternately produce $D_2(t)$ and $D_2(t-T)$, the signals $D_1(t-T)$ and $D_2(t-T)$ being respectively considered as being equal to $D_1(t)$ and $D_2(t)$, according to the known art.

The circuits which ensure the correct operation of the receiver switch have not been shown here.

If the above mentioned identification system is used, signal $a_1$ is recovered at the output of the discriminator 93 and signal $a_2$ at the output of the discriminator 94, during the checking periods, if the switch 86 is operating properly. Should this not be the case, the phase of the changes of state in the switch signal generator, is adjusted by means of known devices, like those used in the "SECAM" system with a conventional frequency modulated subcarrier.

Of course, the subcarrier generating circuit can comprise means for reducing the visibility of the subcarrier by means of phase shifts carried out during horizontal and/or vertical blanking intervals.

In particular the known device employed in the "SECAM" system, which has a subcarrier modulated exclusively in frequency by two signals alternating at line frequency, can be used, in which case (a) the same initial phase is given to the modulated subcarrier at the beginning of each active line duration and then, (b) phase reversal is carried out on the output signal of the modulating device during predetermined horizontal and vertical blanking intervals. Step (a) may for example be applied to the frequency modulated oscillator 36 (FIG. 1) by locking its phase by means of a stable reference oscillator oscillating at the subcarrier resting frequency $F_0$.

As far as phase reversal is concerned, with a 625 line standard, the subcarrier can for example be shifted in phase by an angle of $\pi$ radians for the course of one out of three successive line durations and, in addition, shifted in phase by $\pi$ radians (this second series of phase shifts being superimposed upon the first) during one out of two successive fields.

The invention is naturally not limited to the embodiments described and illustrated hereinbefore. It will be noted in particular that in the circuit of FIG. 3 in the receiver, repetition of the subcarrier is obtained by means of a delay line which delays the subcarrier by T, which means that the demodulating device comprises two frequency discriminators.

The subcarrier can obviously be demodulated in its sequential form by means of a single frequency discriminator the output of which will alternately supply the signals $D_1(t)$ and $D_2(t)$, and those two signals can subsequently be repeated by means of a device of similar design as the one repeating the subcarrier. However, this requires that the delay device operate at video frequency, whereas, as is well-known, it is preferable for technical reasons to operate the repeating circuit at subcarrier frequency.

On the other hand, it is understood that the subcarrier generating circuit can comprise additional elements which either do or do not have counterparts in the receiver circuit, according to whether they do or do not influence the signals finally restored by the receiver.

As in the "SECAM" system, where only frequency modulation is used for the transmission of signals $D_1$ and $D_2$, the frequency modulated subcarrier can be sent through a filter referred to as a coding filter, prior to its addition to the luminance signal. The gain of this coding filter varies strongly with the frequency, which practically gives the subcarrier a parasitic amplitude and phase modulation as a function of the signal M. The subcarrier then has to pass through another filter, in the receiving circuits, called decoding filter, before being applied to the demodulating circuit or circuits. This decoding filter compensates for the abovementioned parasitic modulations.

It will finally be noted that an important application of the present invention is the magnetic recording of television programmes and, in particular, of the picture information contained in a composite video signal comprising a colour subcarrier of another type than the one used here; the subcarrier generated according to the invention will then only be used for the recording and for the subsequent restoring of the signals $D_1$ and $D_2$ to form a new subcarrier. In this case the visibility of the subcarrier generated according to the invention has little importance.

If the television programme was obtained by the method of the N.T.S.C. system, the circuit of FIG. 2 can be simplified, as the N.T.S.C. subcarrier itself can be used instead of the signal supplied in FIG. 2, by the adding network 47. Nevertheless, a sinusoidal signal having appropriate frequency and phase should then be available for feeding the phase detector 49, which can be obtained by an oscillator phase-locked by the colour burst included in the N.T.S.C. signal and by a suitable phase-shifting device.

An identification signal will of course be used, for example, a signal which is transmitted during one out of two successive horizontal blanking intervals.

What is claimed, is:

1. A color subcarrier generating circuit for colour television systems of the type in which the composite video signal comprises a luminance signal and a color subcarrier used for alternately transmitting two colour signals $D_1$ and $D_2$, which are linear functions of the primary colour signals, the alternation taking place at line frequency, said subcarrier generating circuit comprising a first circuit having an output for generating a signal D such that $D_1=D \cos \varphi$. $D_2=D \sin \varphi$ and $\sqrt{D_1^2+D_2^2}=D$; a second circuit having an output for generating a signal M which is alternately equal to $D_1/D$ and $D_2/D$, the alternation taking place at the line frequency, a frequency modulator having a modulation input coupled to the output of said second circuit and an output, and an amplitude modulator having a modulation input coupled to the output of the first circuit, a carrier input coupled to the output of the frequency modulator and an output, the output of the amplitude modulator being the output of the colour subcarrier generating circuit, and supplying a signal which is amplitude modulated by the signal D and frequency modulated by the signal M, said first and second circuits including a common circuit comprising means for supplying an auxiliary signal amplitude modulated by said signal D and phase modulated by said angle $\varphi$.

2. A colour subcarrier generating circuit as claimed in claim 1, wherein said common circuit comprises: a generator device, for delivering, respectively at a first and a second output, two sine waves with respective phase $wt$ and $wt+\pi/2$, where $w$ is a constant angular frequency and $t$ the time; modulating and adding means having a first signal input for receiving said signal $D_1$, a second signal input for receiving said signal $D_2$, a first and a second carrier input respectively coupled to said first and second outputs of said generator device, and an output for supplying said auxiliary signal, said first circuit further comprising: an envelope detector having an input coupled to said output of said modulating and adding means, and an output for supplying said signal D; said second circuit further comprising: switching means having a first signal input coupled to said first output of said generator device, a second signal input coupled to said second signal of said generator device, and an output for alternately supplying said two sine waves, the alternation occurring at line frequency, means for bringing to constant amplitude said auxiliary signal, having an input coupled to said output of said modulating and adding means, and an output; and a phase detector having a first input coupled to said output of said switching means, a second input coupled to said output of said means for bringing to constant amplitude, and an output for supplying said signal M.

3. Apparatus in accordance with claim 1, further including; a colour subcarrier handling circuit for restoring signals D, and $D_2$, said handling circuit comprising: at least one demodulator, responsive to both the amplitude and the frequency of its input signal, said demodulator having an input; and means for applying to said demodulator input said subcarrier both amplitude modulated by signal D and frequency modulated by signal M.

4. A colour subcarrier handling circuit as claimed in claim 3; said handling circuit comprising: a general input for receiving said subcarrier a direct channel and a delay channel, said channels having respective inputs coupled to said general input, and respective outputs; said delay channel comprising a delay device for imparting to the subcarrier propagating therethrough a delay equal to one line duration relatively to the subcarrier propagating through the direct channel; two demodulators having respective inputs, each of said demodulators being responsive to both the amplitude and the frequency of the signal applied to its input; and switching means for alternately applying the output subcarrier, both amplitude modulated by signal A and frequency modulated by signal M, of said direct and said delay channel respectively to the input of said first and second demodulators and vice versa, the alternation occurring at the line frequency.

5. A colour subcarrier handling circuit as claimed in claim 3, wherein said demodulator comprises at least one frequency discriminator, responding linearly to the amplitude of its input signal.

References Cited

UNITED STATES PATENTS 3,069,679 12/1962 Sweeney et al. ____ 325—139 XR
3,296,367 1/1967 Cassagne et al.

ROBERT L. GRIFFIN, Primary Examiner

R. MURRAY, Assistant Examiner